(12) United States Patent
Polyzois et al.

(10) Patent No.: US 7,866,121 B2
(45) Date of Patent: Jan. 11, 2011

(54) COMPOSITE WIND TOWER SYSTEMS AND METHODS OF MANUFACTURE

(75) Inventors: Dimos Polyzois, Winnipeg (CA); Nibong Ungkurapinan, Bangkok (TH)

(73) Assignee: The University of Manitoba (CA)

( * ) Notice: Subject to any disclaimer, the term of this patent is extended or adjusted under 35 U.S.C. 154(b) by 0 days.

(21) Appl. No.: 12/020,250

(22) Filed: Jan. 25, 2008

(65) Prior Publication Data

US 2008/0184654 A1    Aug. 7, 2008

Related U.S. Application Data

(63) Continuation of application No. PCT/CA2006/001267, filed on Jul. 24, 2006.

(60) Provisional application No. 60/701,982, filed on Jul. 25, 2005.

(51) Int. Cl.
 *E04C 3/00* (2006.01)
(52) U.S. Cl. .............. 52/848; 52/835; 52/40; 52/169.13; 52/296; 428/376; 343/890
(58) Field of Classification Search .......... 52/835, 52/834, 121, 40, 632, 170, 169.13, 848, 296; 428/376; 343/890
See application file for complete search history.

(56) References Cited

U.S. PATENT DOCUMENTS

| | | | | |
|---|---|---|---|---|
| 232,360 | A * | 9/1880 | Milliken | 52/848 |
| 1,784,770 | A * | 12/1930 | Wiley | 52/170 |
| 3,034,209 | A * | 5/1962 | Bianca et al. | 29/432 |
| 3,248,831 | A * | 5/1966 | Jones | 52/121 |
| 3,270,480 | A * | 9/1966 | Beecker | 52/848 |
| 3,495,370 | A * | 2/1970 | Bertil et al. | 52/632 |
| 4,172,175 | A * | 10/1979 | Pearson et al. | 428/376 |
| 4,242,160 | A | 12/1980 | Pinter et al. | |
| 5,615,855 | A * | 4/1997 | Marue et al. | 248/405 |
| 6,399,881 | B2 * | 6/2002 | Edelstein | 174/45 R |
| 6,408,575 | B1 * | 6/2002 | Yoshida et al. | 52/40 |
| 6,453,636 | B1 * | 9/2002 | Ritz | 52/835 |

(Continued)

FOREIGN PATENT DOCUMENTS

DE    3842026 A1    7/1990

(Continued)

OTHER PUBLICATIONS

Brughuis, F.J. "Advanced Tower Solutions for Large Wind Turbines and Extreme Tower Heights" Mecal Applied Mechanics, Netherlands, website, http://www.mecal.nl, 2005. 4 Pages.

(Continued)

*Primary Examiner*—Richard E Chilcot, Jr.
*Assistant Examiner*—Chi Nguyen
(74) *Attorney, Agent, or Firm*—St. Onge Steward Johnston & Reens LLC

(57) ABSTRACT

The present invention relates generally to composite fiber-reinforced polymer (FRP) wind tower systems and methods of manufacture. More particularly, the present invention relates to a composite FRP wind tower system including a plurality of tower cells for functional engagement with adjacent tower cells along mating surfaces to form a tower section, each tower cell including a lower end and an upper end for telescopic engagement with a tower cell of an adjacent tower section.

8 Claims, 7 Drawing Sheets

U.S. PATENT DOCUMENTS

| | | | |
|---|---|---|---|
| 6,782,667 | B2 | 8/2004 | Henderson |
| 6,901,717 | B2 * | 6/2005 | Brunozzi et al. ............... 52/834 |
| 6,907,706 | B1 * | 6/2005 | Schippmann et al. ......... 52/848 |
| 7,160,085 | B2 * | 1/2007 | de Roest .................. 416/244 R |
| 7,253,786 | B1 * | 8/2007 | Logozzo ..................... 343/890 |

FOREIGN PATENT DOCUMENTS

| | | |
|---|---|---|
| RU | 2244083 C2 | 1/2005 |
| WO | 2005028781 A2 | 3/2005 |

OTHER PUBLICATIONS

Brosius, D. Carbon fiber raises consumer performance index. Jan. 2005. Retrieved from the Internet: URL:http://www.compositesworld.com/hpc/issues/2005/January/705/1>.

Marsh G, "Composites Enable Cheaper Wind Energy", Reinforced Plastics, vol. 45, No. 7/8, Jul./Aug. 2001, pp. 28-33.

Cordis, "High Winds", http://aoi.cordis.lu/article.cfm?article=1138, Dec. 2003, 2 Pages.

DOE Grant No. DE-FG02-03ER83830, Dr. Clement Hiel, et al. "Cost Effective Approach to Tall Composite Wind Turbine Towers by Allowing On-Site Fabrication" Composite Support & Solutions, Inc.. 32526 Seahill Drive, Building C-11, Rancho Palos Verdes, CA. Retrieved from Internet on Jun. 29, 2004 via http://www.science.doe.gov/sbir/awards_abstracts/sbirsttr/cycle20/phase2/043.htm. 1 Pages.

International Search Report & Written Opinion of the International Searching Authority, Oct. 2, 2006, 9 Pages.

Isotruss Structures Inc. Materials, Isotruss is the lightest of all structural tubes and beams. Mar. 2005. Retrieved from the Internet: URL:http://www.isotruss.com/materials.asp>. Date of publication: established from Internet Archives at: URL:http://web.archive.org/web/20050306235133/http://www.isotruss.com/materials.asp>.

Moishe Garfinkle, Advanced Wind Turbine for Multi-Megawatt Power Generation. Mar. 2005. Retrieved from the Internet: URL:http://www.pages.drexel.edu/'garfinkm/WindIntro.html>. Date of publication: established from Internet Archives at: <URL:http://web.archive.org/web/20050313161041/http://www.pages.drexel.edu/'garfinkm/WindIntro.html.

Jacob A. "Composites—Prime Enabler for Wind Energy" Wind Energy Supplement, Reinforced Plastics, vol. 47, No. 5, May 2003, pp. 23-45.

Wind Tower Composites "The Need for Lightweight, Composite Towers" Wind Tower Composites, LLC, 4320 E. Lake Creek Farms, Herber City, UT. http://windtowercomposites.com, 2003. 9 Pages.

* cited by examiner

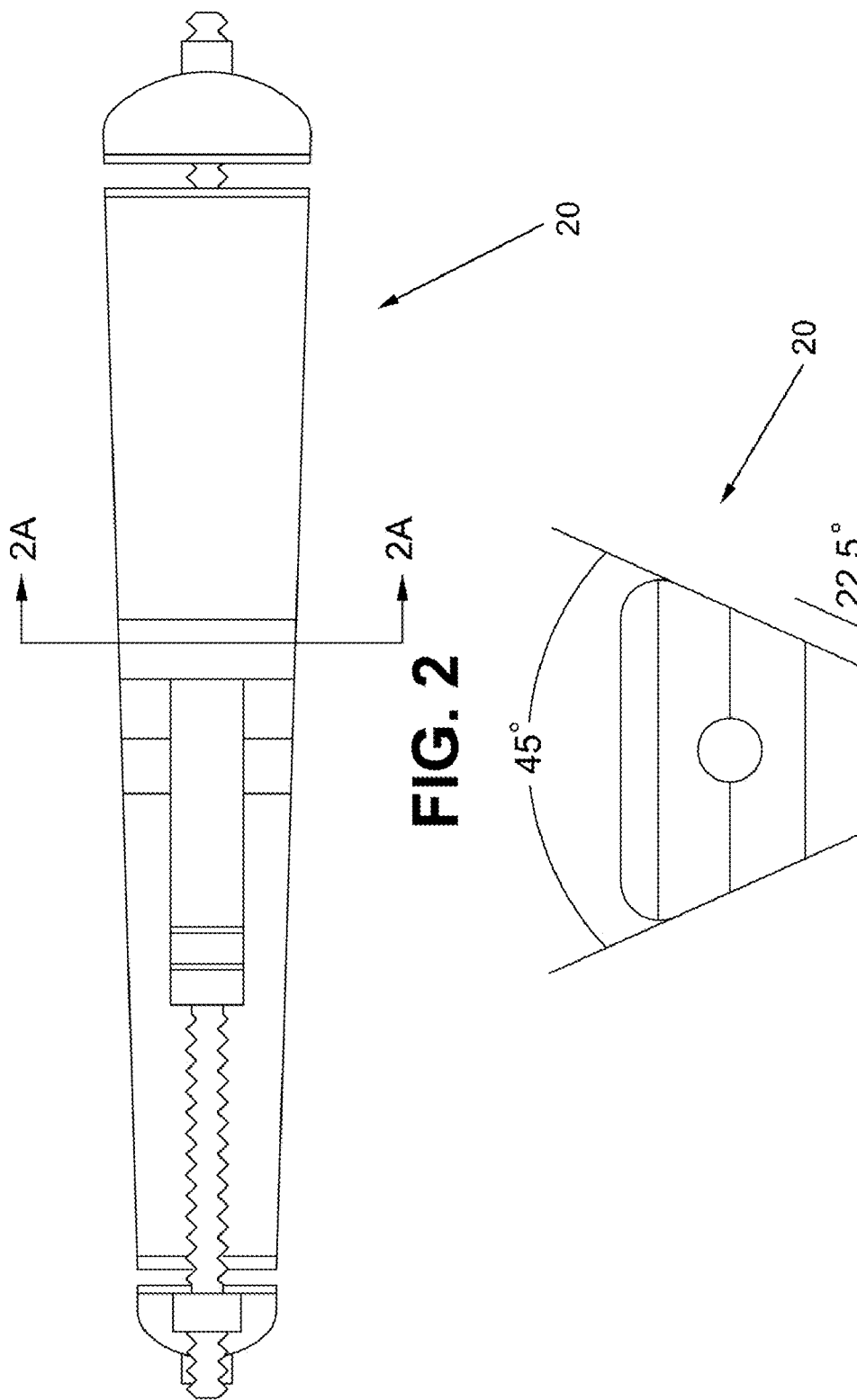

CLOSED

OPEN (SHEET 1 OF 2)

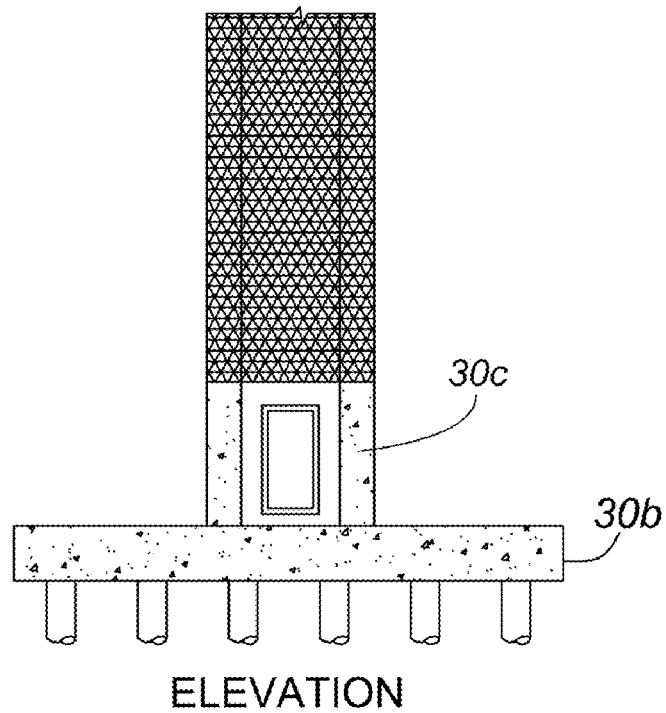
ELEVATION
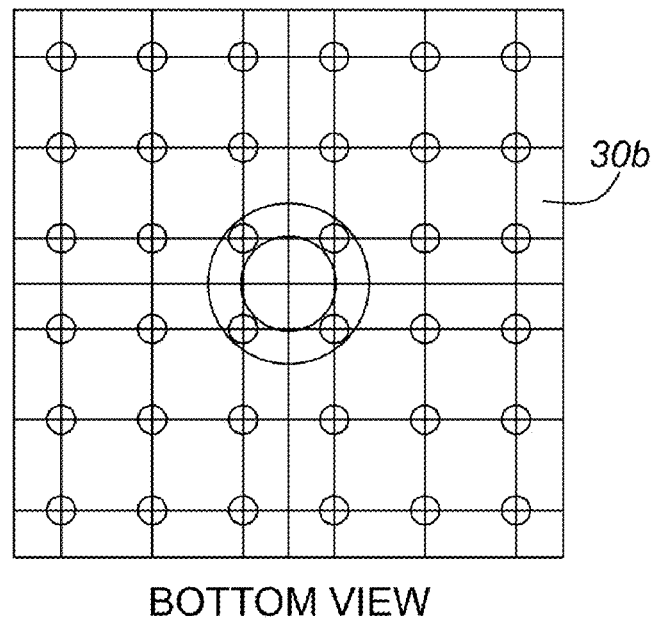
BOTTOM VIEW
(SHEET 2 OF 2)
FIG. 4

COMPOSITE WIND TOWER SYSTEMS AND METHODS OF MANUFACTURE

CROSS-REFERENCE TO RELATED APPLICATIONS

The present application is a continuation of pending International patent application PCT/CA2006/001267 filed on Jul. 24, 2006 which designates the United States and claims priority from U.S. provisional patent application 60/701,982 filed on Jul. 25, 2005, the content of which is incorporated herein by reference.

FIELD OF THE INVENTION

The present invention relates generally to composite fiber-reinforced polymer (FRP) wind tower systems and methods of manufacture. More particularly, the present invention relates to a composite FRP wind tower system including a plurality of tower cells for functional engagement with adjacent tower cells along mating surfaces to form a tower section, each tower cell including a lower end and an upper end for telescopic engagement with a tower cell of an adjacent tower section.

BACKGROUND OF THE INVENTION

Wind energy is the world's fastest growing energy source and is already a major source of energy across Europe. By the end of 2002, Europe was producing approximately 75% of the world's total wind energy, while Canada produced only 0.4% (Jacob, 2003). Technological advancements over the last 25 years have resulted in significant reduction in the cost of wind generated energy from 38 US cents (per kWh) in 1982 to between 4 and 6 US cents (per kWh) in 2001 (Jacob, 2003). According to Marsh (2001), this dramatic decrease is mainly due to the use of composite materials for the construction of lighter rotor blades. Indeed, composite materials are slowly finding their way into more and more applications in wind generator nacelles, cabins, fairings and parts of towers. Industry estimates suggest that 80,000 tons of finished composites will be required annually by 2005 for rotor blades alone.

Composite materials have the potential to decrease the total weight of the wind towers, leading to substantial saving in transportation and erection costs, making wind energy more affordable for remote and rural communities where the number of s required is usually small. In a white paper published by WindTower Composites (2003), it was reported that the cost of composite towers, based on a 2-unit wind farm, is 38% less than the cost of steel towers. For a 25-unit wind farm, the cost of composite towers is 28% less than steel towers. Thus, even though the cost of composite materials per unit weight is higher than that of steel, the lower total weight of composite towers compared to steel, results in lower transportation and erection costs. Furthermore, the cost advantage for steel has been eroding over the last year as the price of steel in the world market has increased, while the cost of composite materials has been steadily decreasing. As a result, research in the development of composite wind towers has begun in earnest both in the United States and Europe (DOE, 2003; CORDIS, 2003).

The use of wind energy in rural communities will often provide significant economic advantages over conventional power generating systems. For example, Cambridge Bay, Nunavut is a community of about 1,200 people, located on the south shore of Victoria Island in the Canadian Arctic. Electrical power is provided by diesel shipped in from Hay River by barge in the summer. The results from an NRCan study, indicate that conversion to wind power would displace about 300,000 liters of fuel per year. At 1999 fuel prices, this translates to an annual saving of $258,000 in fuel costs.

The application of composite wind towers, however, is not limited to remote areas. As the cost of steel continues to rise and as towers become larger, high materials costs, coupled with high transportation and erection costs, makes composite materials more attractive for the construction of small wind farms.

As a result, there has been a need for the construction of lightweight and more durable wind towers made of composite materials where transportation and erection problems make the use of heavy equipment difficult and in offshore regions where corrosion is of major concern.

SUMMARY OF THE INVENTION

It is an object of the present invention to obviate or mitigate at least one disadvantage of previous wind tower systems.

In a first aspect, the present invention provides a composite FRP wind tower system comprising a plurality of tower cells for functional engagement with adjacent tower cells along mating surfaces to form a tower section. Each tower cell includes a lower end and an upper end for telescopic engagement with a tower cell of an adjacent tower section.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 2 is schematic side and cross-sectional diagram of a mandrel system in accordance with the invention;

DETAILED DESCRIPTION OF THE INVENTION

Generally, the present invention relates to a composite FRP wind tower system, methods of manufacture and assembly. The wind tower system includes tower cells assembled to form a tower section and a foundation system.

Tower Cells and Tower Sections

Tower cells and tower sections are shown in FIGS. 1A-1D. A tower section 10 includes a number of identical tower cells 10a assembled to form a tower section. Tower sections are interconnected to form a tower 12.

Figure 1A:
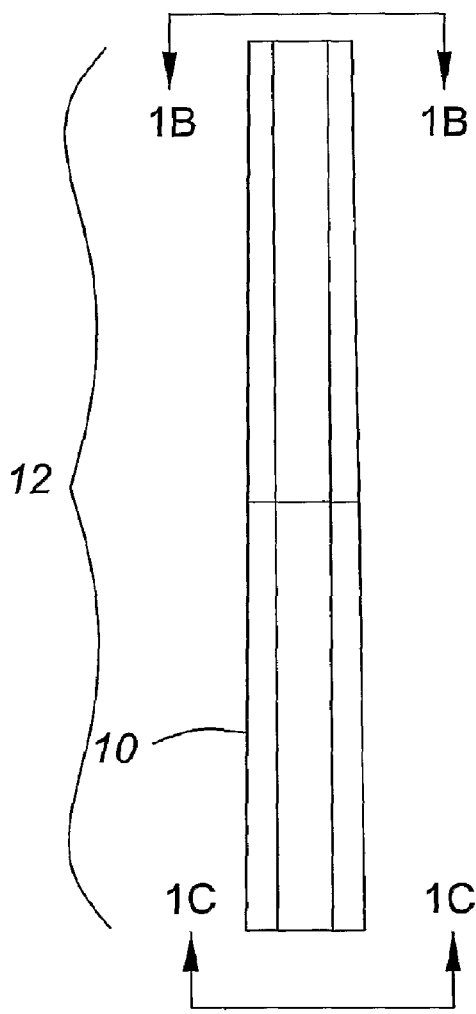
FIG. 1A is a side view of an assembled composite tower in accordance with the invention.
Figure 1D:
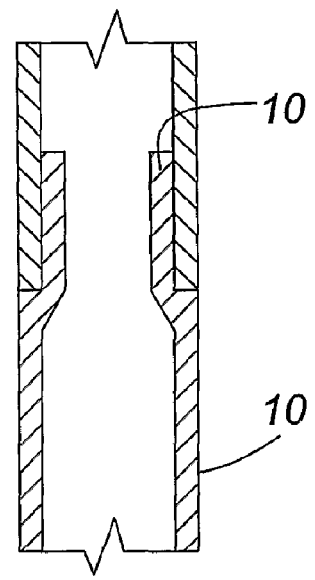
FIG. 1D is a cross-sectional view of a joint between an upper and a lower cell in accordance with the invention.
Figure 1B:
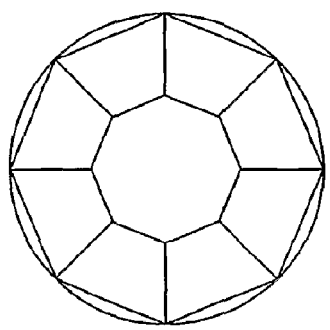
FIG. 1B is a top view of an assembled composite tower in accordance with the invention.
Figure 1C:
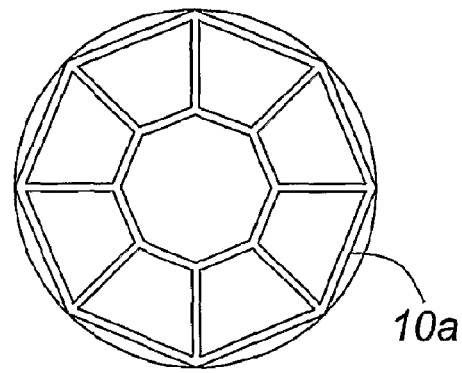
FIG. 1C is a bottom view of an assembled composite tower in accordance with the invention.
Figure 3A:
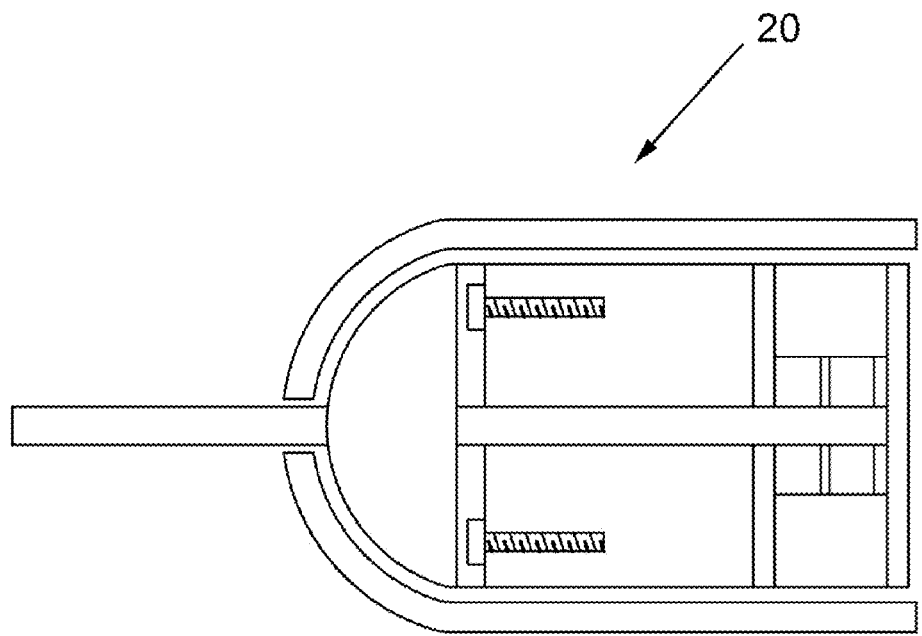
FIG. 3 is a schematic cross-sectional diagram of a mandrel system in a closed and open position in accordance with the invention.
Figure 3B:
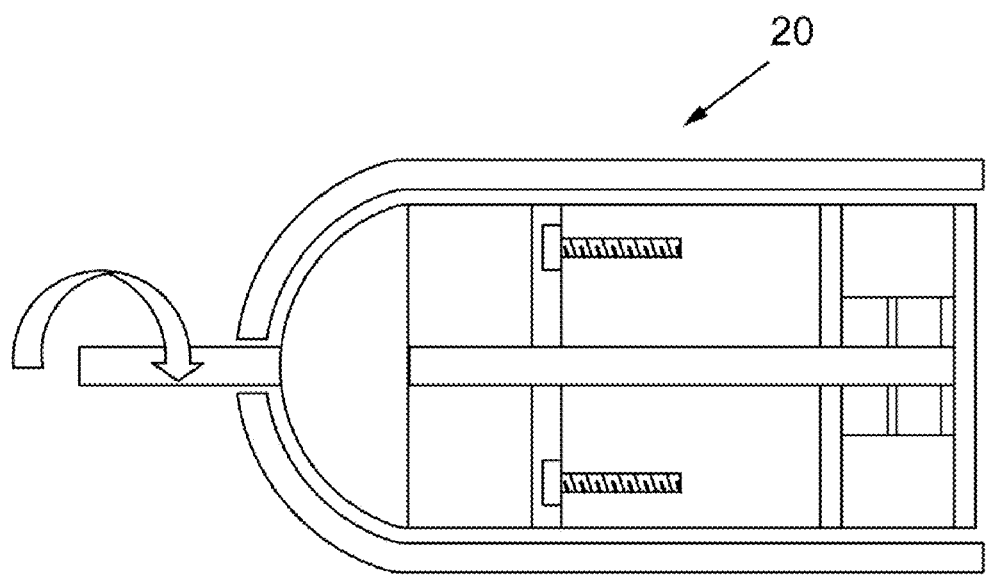

Individual tower cells are generally trapezoidal in cross section and tapered from one end to the other as shown in FIGS. 1B and 1C. The number, size, and taper of the individual tower cells used to assemble a tower section will depend on the desired design and required loading conditions, height and application of the tower.

Individual tower cells are fabricated from resin impregnated fibers such as glass and/or carbon fibers. The orientation of the fibers may be varied to impart particular design characteristics to the tower, including strength and stiffness, as may be determined through a computer model described in Applicant's copending U.S. provisional application entitled "Design System for Composite Wind Towers" filed concurrently on Jul. 25, 2005 and incorporated herein by reference.

Fabrication of Tower Cells

Individual tower cells for a given tower section are fabricated using filament winding on a mandrel. Separate tower sections utilize different mandrels.

Each tower cell has an upper and a lower end having male and female fittings respectively. The lower end is designed and fabricated as a female end so as to telescopically engage with the male end of the cell below, as shown in FIG. 1D. In a preferred embodiment, the degree of overlap length between two cells of adjacent tower sections 10, 10' is approximately 10% of the length of a tower cell.

Tower cells are fabricated on a support mandrel 20 as shown in FIGS. 2A, 2B, 3A, 3B. The mandrel preferably incorporates a self-extraction mechanism to facilitate removal of the tower cell from the mandrel. The self-extraction mechanism includes a threaded shaft and nut within the mandrel to enable the linear extension of the mandrel within a cured tower cell. Prior to fabricating the individual cells, several coats of a mold cleaner, a mold sealer, and a releasing agent are applied to the surface of the mandrel and polished. Mylar sheets are also wrapped around the mandrel to facilitate removal of the finished cell.

The fiber layer sequence of filament winding is predetermined through a computer model as per the design criteria. The fibers are saturated with resin and wrapped using a robotic filament winder. Unidirectional glass or carbon fibers are placed either through the filament winding process or alternatively by using mats (0 degree fibers) cut to required length and saturated with resin. Once the fabric is saturated with resin, the fabric is rolled in the longitudinal direction and unrolled onto the mandrel. This technique may be used to provide 0 degree fiber orientation in the absence of a filament winding machine capable of placing fibers in the longitudinal (0 degrees) direction. A saturated glass fiber string may be used to hold the fabric in place during winding. Finally, circumferential layers (ie 90 degree layers) of resin-saturated glass or carbon fibers are wound. The finished cells remain on the mandrel until curing is complete. Once the cells are cured, they are removed from the mandrel by a mandrel removal process as described above.

An individual tower section will be preferably assembled from 8-12 identical tower cells and more preferably from 8 tower cells.

Wind Tower Foundation

Figure 4:
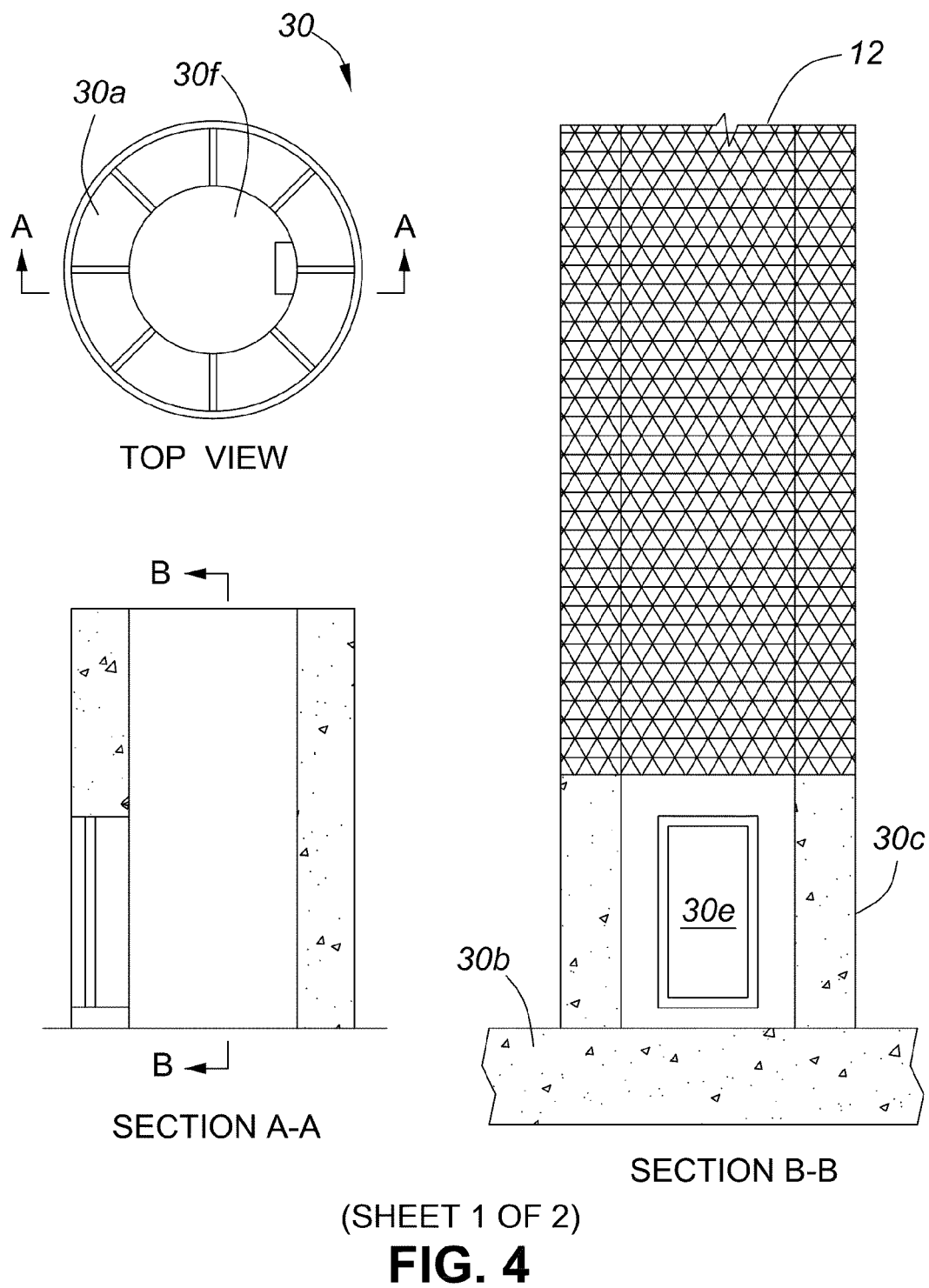
FIG. 4 shows top, bottom, side and cross-sectional views of a composite tower foundation in accordance with the invention; and, FIGS. 5A-5G show the assembly process of composite tower in accordance with the invention.

The tower cells and tower sections are erected on a wind tower foundation 30 designed to provide a stable and firm support to the composite tower, while also allowing fast erection of the tower. An example of a foundation for composite towers comprises a hollow concrete base having solid male inserts 30a designed to receive the base of individual tower cells, as shown in FIGS. 4 and 5.

The wind tower foundation includes a ground contacting base 30b and a wall 30c and roof 30d structure for supporting the male inserts 30a. An access door 30e is provided to enable access to the interior to the structure. The roof also includes a through hole 30f, to enable cables from the nacelle to pass through the roof to the foundation. Individual cells are secured to the foundation by a layer of epoxy and a tight fit with the concrete male inserts.

Installation Process

During installation, the cells of the lower section are individually placed onto the reinforced concrete foundation, as shown in FIGS. 5A-5G. Epoxy resin, preferably thickened with silica powder, is applied on the vertical contact surfaces of each cell before the next tower cell is inserted onto the foundation such that each successive cell becomes bonded to its two adjacent tower cells. The same process is used until all cells of the first section are installed. As a result, all cells of a tower section are adhered to one another along each mating surface.

Figure 5A:
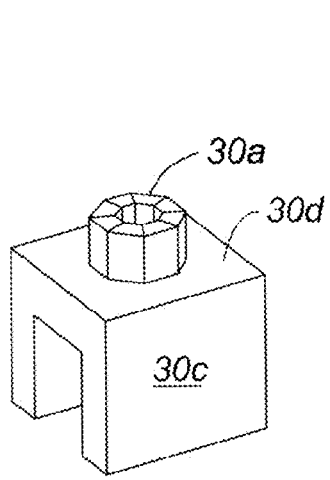
Figure 5B:
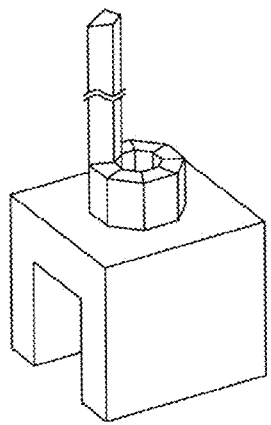
Figure 5C:
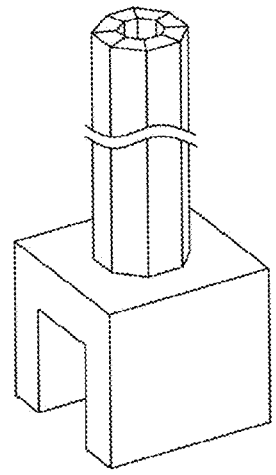
Figure 5D:
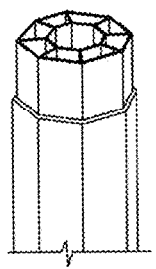
Figure 5E:
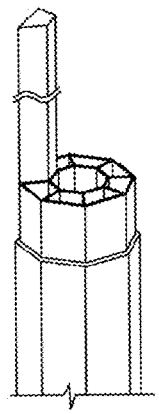
Figure 5F:
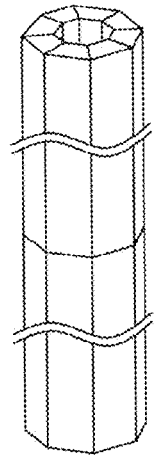
Figure 5G:
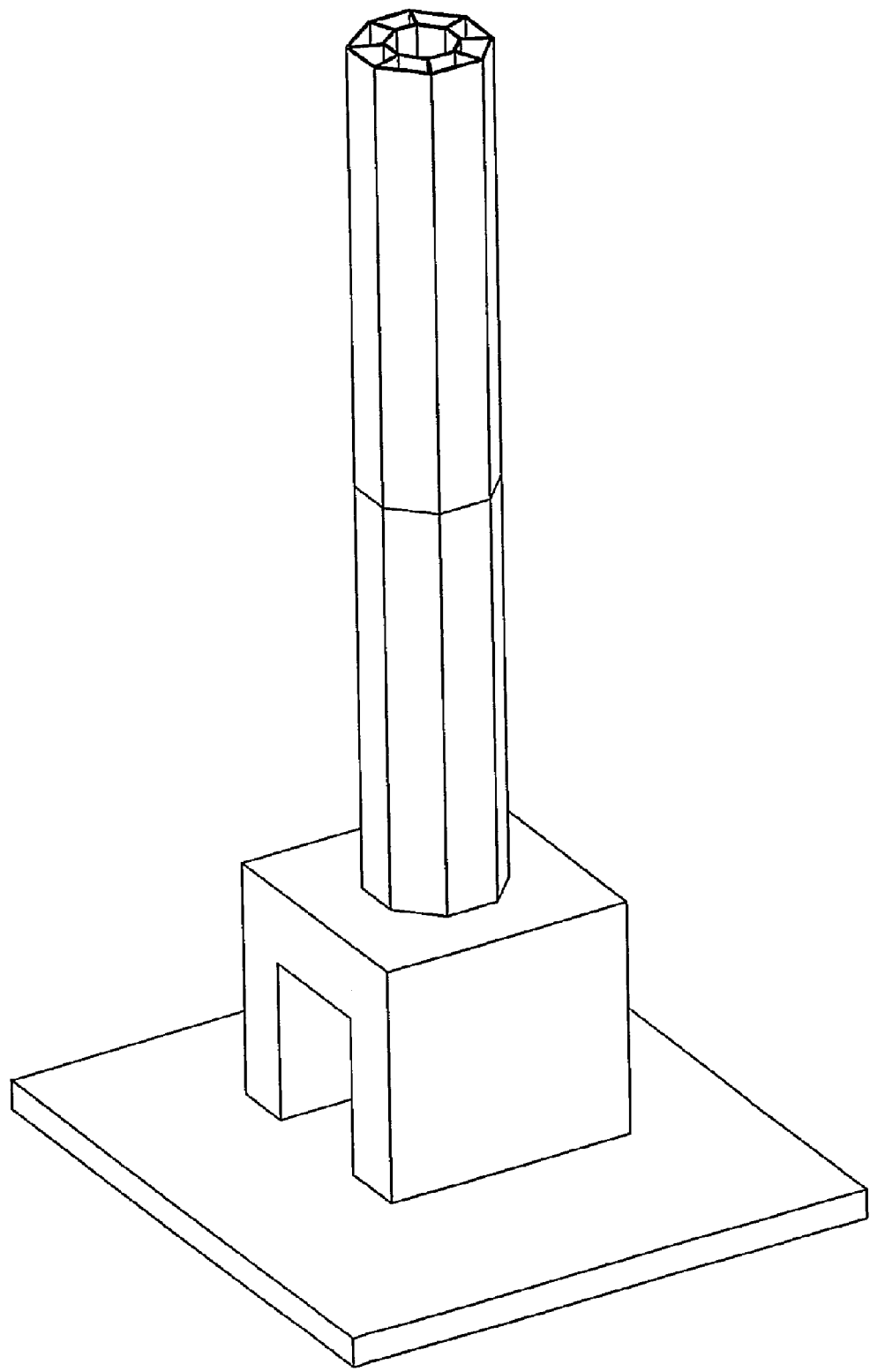

A steel strap may be optionally used at the middle of the lower section to hold the lower tower cells in place during curing and before an upper section of cells are installed. The same procedure used in the lower section is repeated for the upper section. Epoxy resin is also preferably applied within the sleeves of the cells in the lower section, as shown in FIG. 5D, before the cells of the upper section are installed. Multiple steel straps are preferably placed at different locations along the height of the tower to hold the cells in position until curing is complete. The steel straps are removed after the tower cells have cured.

Finally, layers of bidirectional resin-saturated fiber tape are wrapped around the tower at the base and at the joints to provide additional confinement at the joints.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A composite fiber reinforced polymer (FRP) wind tower system comprising:
   a plurality of elongated tower cells, said tower cells each having a trapezoidal cross section, two vertical mating surfaces, a lower end and an upper end, said tower cells for functional engagement with adjacent tower cells along respective mating surfaces to form tower sections, wherein the lower ends of said tower cells are adapted for telescopic engagement with the corresponding upper ends of said tower cells of an adjacent tower section for forming a self-supporting wind tower; and
   a foundation, wherein the foundation includes a base for engagement with a supporting surface and a plurality of upwardly projecting inserts, said inserts for mating engagement with the lower ends of said tower cells.

2. The composite FRP wind tower system as in claim 1 wherein said tower cells are tapered from the lower ends to the upper ends.

3. The composite FRP wind tower system as in claim 1 wherein the degree of overlap between two adjacent tower sections is 10% of a tower cell length.

4. The composite FRP wind tower system as in claim 1 wherein said tower sections include 8-12 tower cells.

5. The composite FRP wind tower system as in claim 1 wherein said tower cells are bonded to adjacent tower cells during assembly of said tower sections.

6. The composite FRP wind tower system as in claim 1 wherein said tower sections have a hollow centre after assembly.

7. The composite FRP wind tower system as in claim 1 wherein the base includes a wall and roof system defining an access room, the roof system for supporting the plurality of inserts and wherein the roof system includes an opening for operative communication with the interior of said tower sections.

8. The composite wind tower system of claim 1 wherein adjacent tower sections are wrapped with resin-saturated tape at respective joints between adjacent tower sections.

* * * * *